United States Patent
Sparrow et al.

(10) Patent No.: US 6,608,587 B1
(45) Date of Patent: Aug. 19, 2003

(54) DIGITAL POLARIMETRIC SYSTEM FOR GENERATING POLARIZATION AGILE SIGNALS

(75) Inventors: Mitchell S. Sparrow, Wayne, NJ (US); Joseph Cikalo, Nutley, NJ (US)

(73) Assignee: ITT Manufacturing Enterprises, Inc., DE (US)

( * ) Notice: Subject to any disclaimer, the term of this patent is extended or adjusted under 35 U.S.C. 154(b) by 0 days.

(21) Appl. No.: 09/910,948

(22) Filed: Jul. 24, 2001

(51) Int. Cl.$^7$ .................................. G01S 13/00

(52) U.S. Cl. ..................... 342/188; 342/13; 342/82; 342/83; 342/175; 342/195; 342/361

(58) Field of Search ............... 342/13–20, 82, 342/83, 175, 188, 195, 361, 362–367, 95; 356/364–370

(56) References Cited

U.S. PATENT DOCUMENTS

| | | | | |
|---|---|---|---|---|
| 3,836,973 A | * | 9/1974 | Shnitkin et al. | 342/362 |
| 3,890,571 A | * | 6/1975 | Beyer | 324/95 |
| 5,235,340 A | * | 8/1993 | Shea | 342/188 |
| 5,420,590 A | * | 5/1995 | Shea | 342/188 |

OTHER PUBLICATIONS

U.S. Patent Application Ser. No. 09/711,168; Digital Polarimetric System; Mitchell J. Sparrow et al; Nov. 13, 2000.

* cited by examiner

*Primary Examiner*—Bernarr E. Gregory
(74) *Attorney, Agent, or Firm*—Edell, Shapiro & Finnan,LLC

(57) ABSTRACT

A digital polarimeter employs a signal time stretching technique to apply polarization phase shift characteristics to digitally generated polarization agile signal components. An RF signal to be transmitted is down-converted to an intermediate frequency and digitally sampled at a rate feasible with currently-available analog-to-digital converters. Horizontal and vertical signal components of the sampled IF signal are generated by processing the digital signal samples. Each digital signal sample is "time stretched" by storing each sample in M memory locations, such that N samples occupy M×N memory locations. Because each sample is stored in M memory locations, each incremental phase shift from one memory location to the next corresponds to $1/M^{th}$ of the actual sampling interval. The stretching process effectively increases the digital sampling frequency, yielding sufficient phase resolution. The time-stretched signal components are subsequently compressed, converted to analog signals and up-converted for transmission.

39 Claims, 8 Drawing Sheets

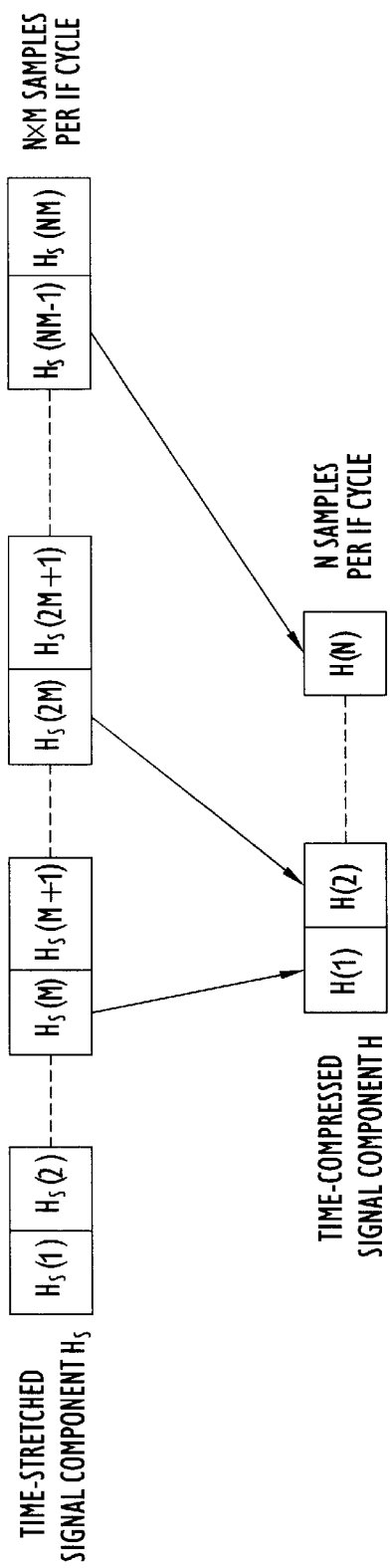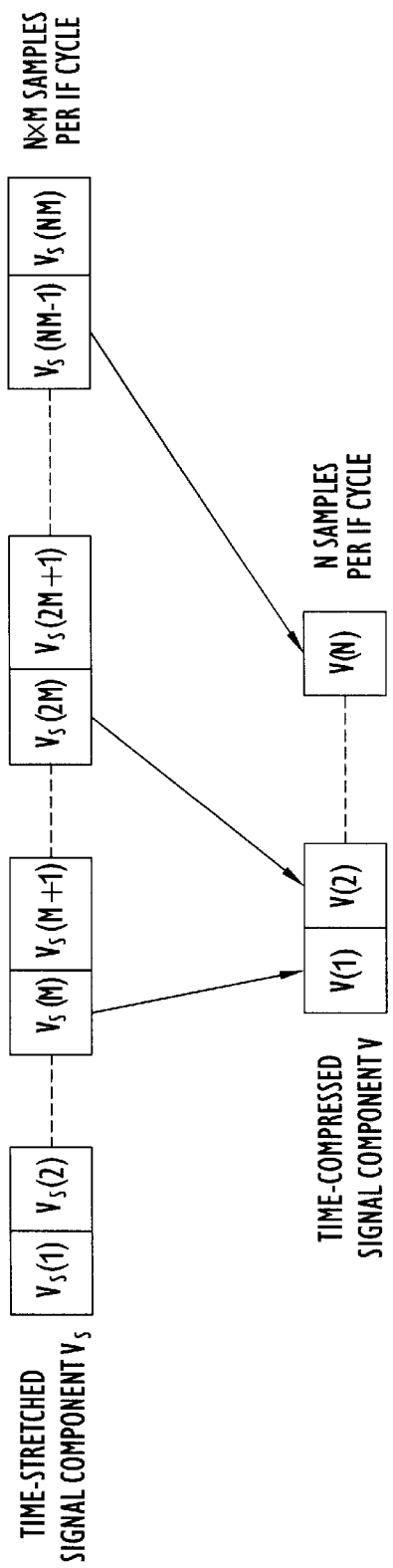

DIGITAL POLARIMETRIC SYSTEM FOR GENERATING POLARIZATION AGILE SIGNALS

BACKGROUND OF THE INVENTION

1. Field of the Invention

The present invention relates to a digital polarimetric system and, more particularly, to a digital polarimeter for controlling the generation of polarization agile signals in a signal transmission system.

2. Description of the Related Art

Ground-based and airborne radar systems have long been used to detect and track hostile targets, such as aircraft and missiles. Typically, a radar system transmits RF signals, such as a sequence of pulses, toward the target. The surface of the target reflects at least some portion of the incident signal energy back toward the radar antenna where the pulse echo is detected, allowing the radar system to determine the target's range, angle or velocity.

To counter the effectiveness of such radar systems, electronic warfare (EW) systems attempt to interfere with radar signals by generating electronic counter measure (ECM) signals designed to confuse, mislead or overwhelm the radar system. By accurately determining the polarization of an arriving radar signal, an EW system can transmit a signal with the same polarization back to the radar system to interfere with the echo signal, or transmit a signal with an orthogonal polarization to deceive or jam the radar system. EW systems have relied on polarimeters to accurately measure the polarization of received radar signals and to control the polarization of the ECM signals transmitted back to the radar system.

Modern EW systems typically include a dual polarized antenna capable of receiving and transmitting RF signals with identifiable horizontal and vertical signal components. Such systems employ two polarimeters: a receive polarimeter, involving a four terminal network inserted into the receiver line; and a transmit polarimeter embedded in the input lines to a pair of power amplifiers which supply the components of signals to be transmitted to input terminals of the dual polarized antenna. The receive polarimeter measures the polarization of intercepted signals and generates two phase signals which represent the determined polarization. The transmit polarimeter receives the phase signals from the receive polarimeter and controls the polarization of a transmitted signal in accordance therewith, thereby producing a polarization agile signal that correspond to the determined polarization of the intercepted signal. Essentially, the transmit polarimeter is an analog network device that accepts one input RF signal and produces two signal components with a specific amplitude and phase relationship determined by the parameters supplied by the receive polarimeter.

EW system technology development was in its infancy at the time polarimeters in currently operational systems were developed; consequently, present polarimeter designs are based on analog components. These analog-based designs result in polarimeters that are bulky, heavy, costly, and that dissipate significant RF signal power. Although polarimeters based on digital technology could potentially avoid these problems, the extraordinarily high digital sampling rates that would be required to accurately measure and apply polarization are not feasible with current technology.

A receive digital polarimeter that overcomes this barrier to use of digital polarimeters is described in U.S. patent application Ser. No. 09/711,168, entitled "Digital Polarimetric System," filed Nov. 13, 2000, hereby incorporated herein by reference in its entirety. The system described therein includes a digital polarimeter that employs a signal time stretching technique and digital signal processing of the time-stretched signal to accurately measure the polarization of a received RF signal with commercially available digital hardware. A superheterodyne receiver down converts received RF signal components to an intermediate frequency (IF), and analog-to-digital converters sample the signal components at much lower sampling rates than would otherwise be required to accurately measure the signal polarization. Each signal sample is "time stretched" by storing each sample in M locations in a memory, such that N samples occupy M×N memory locations. A digital signal processor applies incremental phase shifts to the digital samples until a phase-shifted combination of the digital samples yields a minimum null output. The phase shifts producing the minimum null identify the polarization of the received signal. The stretching and digital processing yield the required number of samples per cycle of the received signal for accurate polarization measurement, thus effectively increasing the digital sampling frequency.

The aforementioned system produces highly accurate polarization measurements with currently available analog-to-digital converters. By using commercially available digital hardware, the digital implementation makes polarimetric systems affordable to more EW systems than the more expensive conventional analog polarimeters. Furthermore, the use of digital polarimeter techniques avoids potential performance degradation caused by cross leakage signals typically present in conventional analog polarimeters, is more compact, lower in weight, more power efficient, and offers a greater mean time between failures than conventional high-power analog polarimeters.

While this digital receive polarimeter provides many advantages, it would be beneficial if similar advantages could be realized in a transmit polarimeter. Without improvements with respect to the transmit polarimeter, designs that include conventional analog transmit polarimeters may remain unaffordable in many small or low-cost EW systems. Furthermore, operational EW systems will remain burdened with the disadvantages of the more expensive, less reliable, bulky, heavy, high power consumption, analog transmit polarimeters. Accordingly, there remains a need for a reliable, inexpensive and compact transmit polarimetric system that uses currently available digital technology to overcome the performance limitations of analog transmit polarimeters.

SUMMARY OF THE INVENTION

Therefore, in light of the above, and for other reasons that become apparent when the invention is fully described, an object of the present invention is to employ digital polarimetric techniques to control the generation of polarization agile transmission signals using commercially available digital hardware.

A further object of the present invention is to reduce manufacturing and maintenance costs of polarimetric systems.

Yet a further object of the present invention is to eliminate performance degradation caused by electromagnetic signal leakage in transmission systems that employ polarimetric devices.

A still further object of the present invention is to reduce power requirements associated with transmission systems that employ polarimetric devices.

Another object of the present invention is to reduce the size and weight of polarimetric systems.

Yet another object of the present invention is to increase the reliability of transmission systems that employ transmit polarimetric devices, for example, increased mean time between failures (MTBF).

It is a further object of the present invention to make practical the delivery of polarization signal data to a remotely located transmitter.

The aforesaid objects are achieved individually and in combination, and it is not intended that the present invention be construed as requiring two or more of the objects to be combined unless expressly required by the claims attached hereto.

In accordance with the present invention, a digital polarimeter employs a signal time stretching technique to apply polarization phase shift characteristics to digitally generated polarization agile signal components using commercially available digital hardware. An RF signal to be transmitted is down-converted to an intermediate frequency (IF) and digitally sampled at a rate feasible with currently-available analog-to-digital converters. Horizontal and vertical signal components of the sampled IF signal are generated, and the digital samples of the two signal components are stored in memory. Each digital signal sample is "time stretched" by storing each sample in M memory locations, such that N samples occupy M×N memory locations. Because each sample is stored in M memory locations, each incremental phase shift from one memory location to the next corresponds to $1/M^{th}$ of the actual sampling interval. The stretching process effectively increases the digital sampling frequency and provides the number of samples per cycle and, hence, phase resolution required to accurately apply high resolution polarization characteristics to the transmit signal.

At stages of the digital polarimeter processing associated with the generation of polarization agile signal components, phase shifts analogous to those applied in a conventional analog transmit polarimeter are applied to the digital sample streams. In effect, the phase shifts required to produce the desired polarization are carried out by shifting mathematical operations performed on stored digital samples (i.e., additions and subtractions of samples in particular memory locations) by a certain number of memory locations that corresponds to a desired phase shift. The number of memory location shifts required to implement a given phase shift is directly related to the number of digital samples/cycle that are used to represent one cycle of the analog signal. Accordingly, where the digital polarimeter system receives phase shift information in analog form, a translation process is used to calculate the corresponding number of memory location phase shifts to be applied to the digital signal samples. In the case where phase shift information is generated by a digital receive polarimeter as a determined number of memory location shifts, the shift values can be directly applied by the transmit polarimeter of the present invention to effect a particular transmit polarization. Once the transmit polarimeter has applied the desired phase shifts, the transmit signal components are time compressed, converted from digital to analog signals, up converted to the original RF carrier frequency and supplied to an antenna for transmission.

Implementation of the time stretching technique makes the digital transmit polarimeter feasible by providing the necessary resolution required to apply highly accurate polarization phase shift characteristics to digitally generated polarization agile signal components. Using commercially available digital hardware, the digital implementation of the transmit polarimeter makes polarimetric systems affordable to more EW systems than the more expensive conventional analog transmit polarimeters. The digital implementation also avoids potential performance degradation caused by cross leakage signals typically present in conventional analog polarimeters. Relative to conventional high-power analog transmit polarimeters, the digital polarimeter of the present invention is more compact, lower in weight and more power efficient. The digital transmit polarimeter of the present invention also offers the potential of a more reliable system, with a greater mean time between failures. More generally, the time stretching technique of the present invention can be applied to a digitized input signal to manipulate the signal phase and amplitude in virtually any manner before being "reconstituted" in the form of a polarization agile transmission signal. Furthermore, polarization control information can be received by the transmit polarimeter of the present invention from a remote receive polarimeter or controller via data links. This capability provides great flexibility not only with respect to the characteristics of the signal to be transmitted, but also with respect to the location, and/or multiple locations, from which the polarization agile signal can be transmitted.

The above and still further objects, features and advantages of the present invention will become apparent upon consideration of the following definitions, descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIGS. 6a and 6b are diagrams showing time compression of horizontal and vertical digital signal components in accordance with the present invention.

DESCRIPTION OF THE PREFERRED EMBODIMENTS

Figure 1:
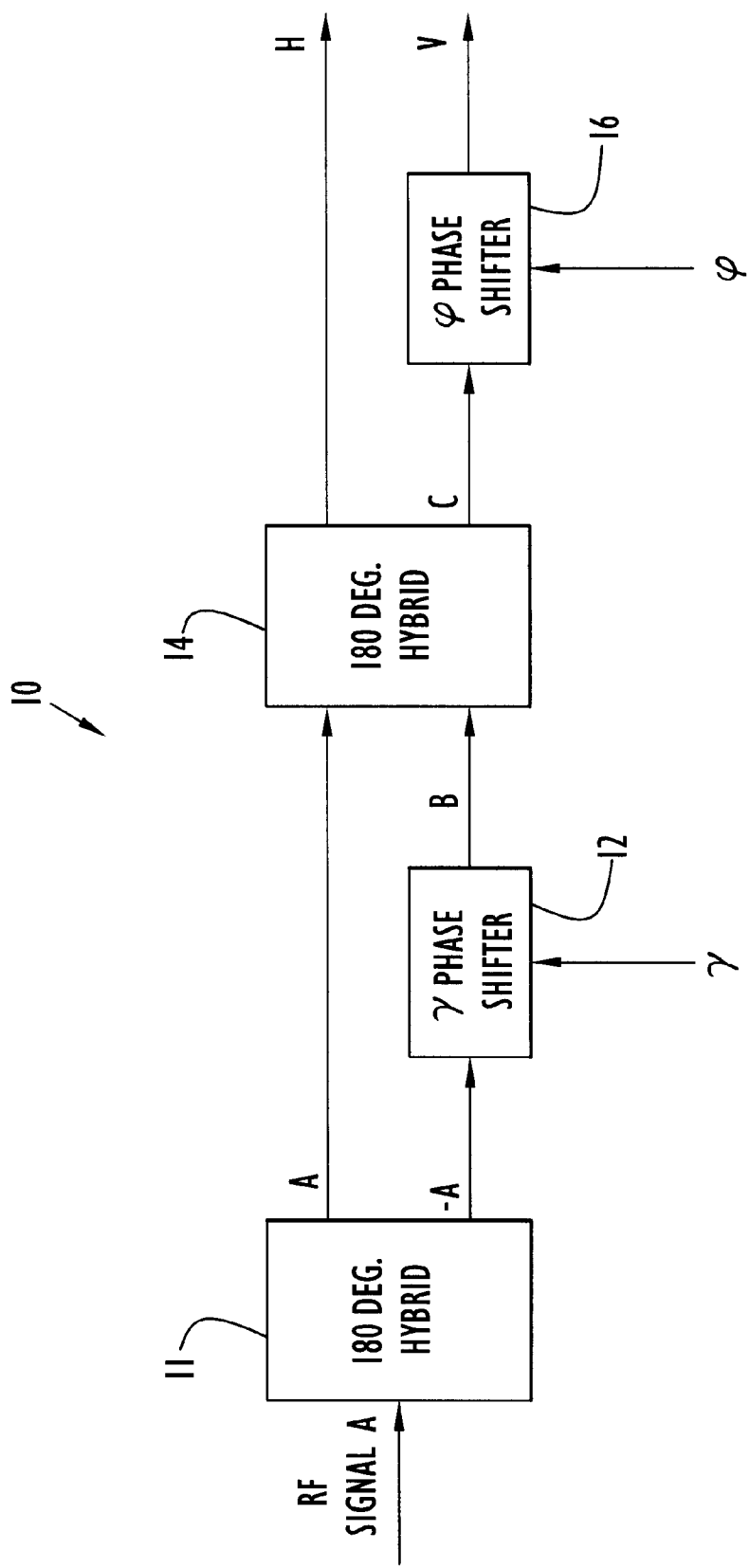
FIG. 1 is a block diagram illustrating a conventional analog transmit polarimetric network.

The following detailed explanations of the figures and of the preferred embodiments reveal the methods and apparatus of the present invention. The digital transmit polarimeter of the present invention essentially replaces a conventional analog transmit polarimeter and the hardware associated therewith. To assist in explaining operation of the digital polarimeter of the present invention, operation of a conventional analog transmit polarimeter is first described. Referring to FIG. 1, an analog transmit polarimeter 10 accepts one input RF signal and produces two output components, namely, the horizontal (H) and vertical (V) components of the signal to be transmitted. The H and V components are respectively supplied to two power amplifiers (not shown), and the power amplifier outputs are passed to a dual polarized antenna 44 for transmission. Characteristics of the polarization agile signal are based on a ratio of signal amplitudes and a phase difference. This information is supplied to the polarimeter in the form of two phase values, $\gamma$ and $\phi$. These values are used as a basis to configure the transmit polarimeter to produce the component signals with the desired characteristics. The phase shift values are derived using the relationship:

$$\gamma = \pi - \gamma_r \text{ and}$$

$$\phi = \phi_r$$

where $\gamma_r = 2\tan^{-1}(A_h/A_v)$, $A_h$ and $A_v$ are the amplitudes of the horizontal and vertical polarization signal components, and $\phi_r$ is a measure of a phase difference between the horizontal and vertical polarization signal components, as determined, for example, in a receive polarimeter. The horizontal and vertical components produced by the transmit polarimeter network shown in FIG. 1 are mathematically defined as:

$$H(t) = A(t)(1 - e^{j\gamma}) \quad (1)$$

$$V(t) = -A(t)(1 + e^{j\gamma} + e^{j\phi} + e^{j(\gamma + \phi)}) \quad (2)$$

where A(t) is the input signal.

Referring again to FIG. 1, a single input signal A is received and passed through a 180° hybrid junction 11 resulting in both an unmodified signal A and a signal −A that has been shifted 180° relative to the input signal. Signal −A is then shifted $\gamma$ degrees by phase shifter 12, resulting in signal B where $B = -Ae^{j\gamma}$. Signals A and B are then combined via a second 180° hybrid junction 14, resulting in signals H and C, where $H = A(1 - e^{j\gamma})$ and $C = -A(1 + e^{j\gamma})$. Signal C is next shifted $\phi$ degrees by phase shifter 16 to produce signal V, where $V = -A(t)(1 + e^{j\gamma} + e^{j\phi} + e^{j(\gamma + \phi)})$. As a result of this analog polarimeter network process, two signals H and V are produced with polarization characteristics relative to the original input signal as defined by equations (1) and (2).

Figure 2:
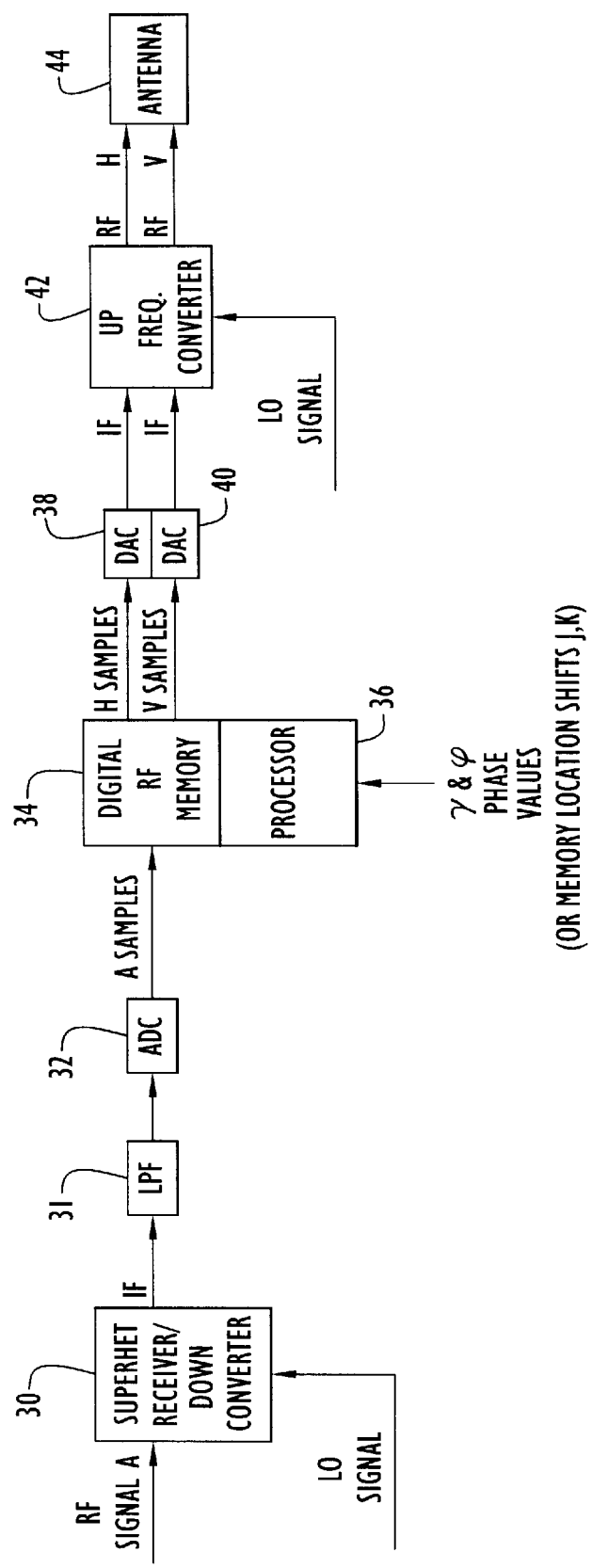
FIG. 2 is a block diagram illustrating a polarization agile transmission system employing a digital polarimeter in accordance with an exemplary embodiment of the present invention.

In accordance with the present invention, a digital polarimeter applies a desired polarization to a transmit signal by essentially performing the digital equivalent of the operations defined by equations (1) and (2) to digitized samples of the transmit signal. An implementation of a digital polarimeter in accordance with an exemplary embodiment of the present invention is shown in FIG. 2. An RF signal whose polarization is to be controlled by the digital polarimeter is first down converted to an intermediate frequency (IF) by mixing the RF signal with a local oscillator (LO) signal in a superheterodyne receiver 30 and passing the resultant IF signal through a low pass filter 31. In a typical EW system, the transmitter is configured to operate in a closed-loop manner with a receiver, wherein the transmit polarimeter attempts to apply a polarization to a transmit signal based on an intercepted signal whose polarization has been measured by a receive polarimeter. In this closed-loop case, the RF signal supplied to the transmit polarimeter is derived from the intercepted signal. The transmitter system can also be configured to operate in an open-loop manner, wherein the transmit polarimeter applies a polarization to a transmit signal in accordance with a predetermined scheme that is less directly dependent on or independent of the measured instantaneous polarization of an intercepted signal. In this open-loop case, the RF signal supplied to the transmit polarimeter can be a locally or remotely generated signal or a predetermined signal (i.e., not derived directly from an intercepted signal).

Referring again to FIG. 2, after down-converting the input RF signal to an IF signal, an analog-to-digital converter (ADC) 32 digitizes the IF signal, producing digital signal samples that are stored in a digital RF memory (DRFM) 34. Based on the polarization characteristics represented by phase values $\gamma$ and $\phi$, a processor 36, such as a digital signal processor, operates on the stored digital signal samples to generate digital samples of the horizontal and vertical components of the signal to be transmitted, as described in greater detail hereinbelow. The signal development is entirely accomplished in the digital domain, requiring only one signal pulse to produce two orthogonally polarized components. The horizontal and vertical component digital samples are converted to analog IF signals by digital-to-analog converters 38 and 40, respectively, and then up-converted to the original RF frequency by mixing the IF component signals with the LO signal in an up-frequency converter 42, yielding RF horizontal and vertical signal components for transmission.

An important aspect of the present invention is the capability to accurately apply the desired phase shifts $\gamma$ and $\phi$ to the transmit signal in the digital domain to produce a particular polarization agile signal. An impediment to the development of a practical digital polarimeter has been a lack of high speed analog-to-digital converters (ADCs) capable of operating at sampling rates sufficiently-high to accurately measure polarization. The required sampling speed is generally determined as follows. Assume that the IF frequency is on the order of 10 MHz. To apply the polarization with a precision of at least 0.5 degrees, the signal would have to be sampled at 0.1/720 µsec. intervals (7.2 GHz), with a ten-bit ADC. (One cycle of the IF signal, spanning 0.1 µsec, is divided in 720 slices, with 0.00013889 µsec.=0.5 degrees.) This task plainly cannot be performed with the current technology devices.

The present invention makes it possible to digitally perform the function of an analog polarimeter by employing a signal time stretching technique and digital signal processing of the time-stretched signal, such that digital polarimetery becomes feasible with commercially available analog-to-digital converters (ADC) operating at much lower sampling rates than would otherwise normally be required. The accuracy with which the digital polarimeter of the present invention applies polarization to a transmit signal is comparable to that of conventional analog polarimeters.

Referring again to FIG. 2, processor 36 is programmed to process the digital signal data stored in memory 34 to apply the desired polarization. More specifically, a computer program operates on the stored digital signal data to apply values of $\gamma$ and $\phi$ that produce the desired polarization. The program is capable of carrying out the same signal-processing task that is ordinarily performed by an analog transmit polarimeter. The nature of this signal processing can be better understood from comparative examination of the analog polarimeter outputs (i.e., the horizontal and vertical signal components) given by equations (1) and (2).

Figure 3:
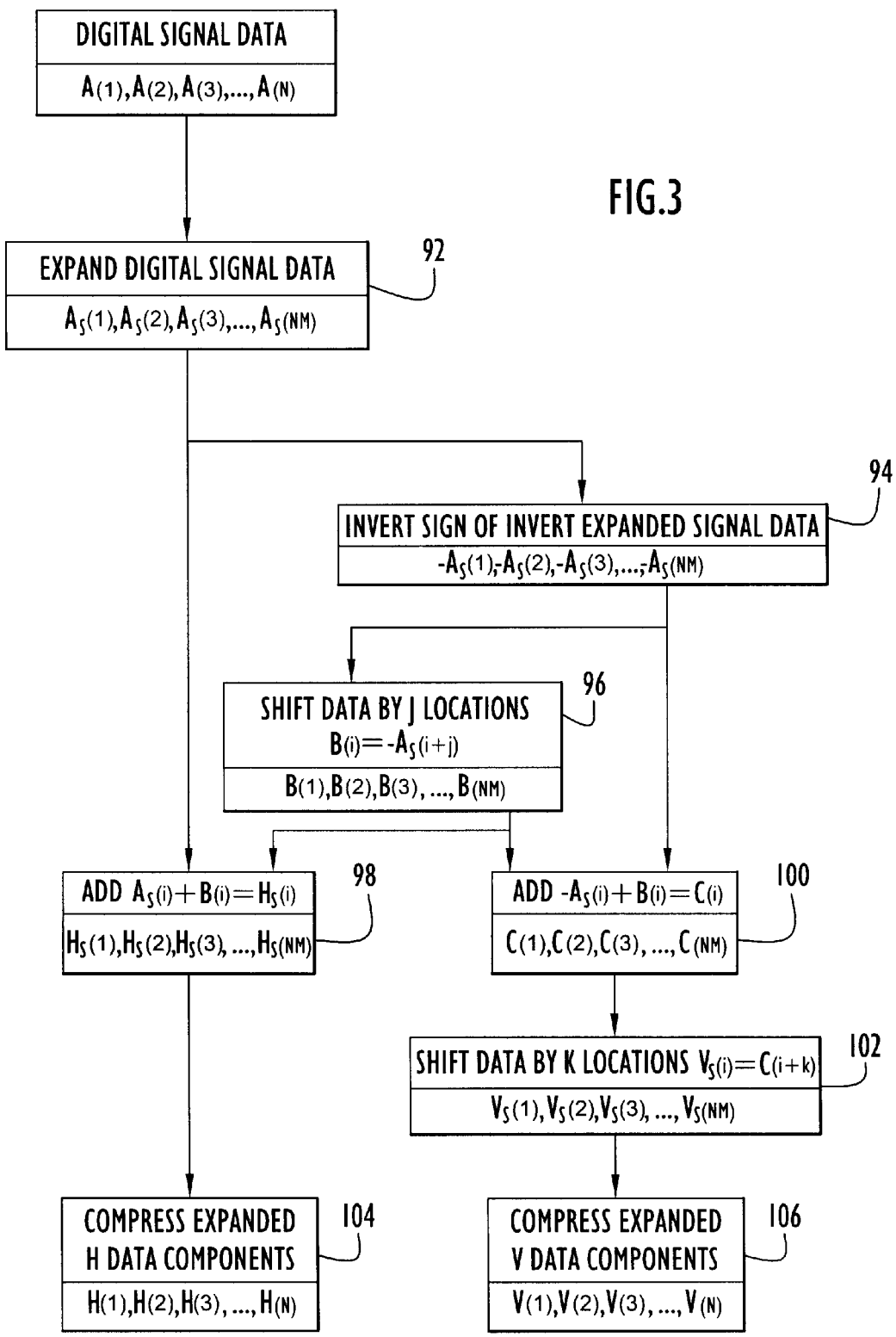
FIG. 3 is a flow diagram depicting the processing performed by a digital transmit polarimeter in accordance with the exemplary embodiment of the present invention.

A flow diagram illustrating the operations performed by processor 36 to implement the transmit polarimetric system in accordance with an exemplary embodiment of the present invention is shown FIG. 3. For comparison with the analog polarimeter shown in FIG. 1, a transmit polarimeter 70 of the exemplary embodiment is also depicted in the form of a block diagram in FIG. 4, in which elements of the digital transmit polarimeter perform certain processing tasks to generate the desired transmit signal. While the transmit polarimeter described in the exemplary embodiment is implemented primarily by running a program on processor that manipulates data in a digital memory device, it will be understood that the present invention is not limited to any particular implementation and can be realized using any combination of software and hardware components.

Characteristics of the polarimeter output signals must be very precise, with allowable deviations being at most several tenths of one degree for acceptable performance. A way to assess the quality of the polarimeter generated signal is to feed the generated signal components to a corresponding receiver polarimeter configured to function in a reversed sense, with the normal outputs of the receiver polarimeter serving as input terminals which receive the generated signal components. When the generated signal components have the proper relationship with respect to the receiver polarimeter measured parameter values, the components will produce a nulled output on the sum signal line of the receiver polarimeter. A measure of performance is the null depth, which is the ratio of the receiver polarimeter difference output ($\Delta$) to the sum output ($\Sigma$) or $20\mathrm{Log}(\Delta/\Sigma)$. The deeper the null produced, the greater is the expected ECM performance of the system. In terms of polarization angular accuracy, null depth is defined as $20\mathrm{Log}(\delta/57.3)$, where $\delta$ is the polarization angular accuracy in degrees. In order to achieve a deep null, greater than −40 dB, the phase error in the development of the signal components must be on the order of 0.5 degrees.

If a conventional analog-to-digital sampling is used, the input signal must be sampled at 0.5 degree intervals (720 samples per cycle) to achieve this angular precision. As an example, if the signal IF is 10 MHz, the required sampling frequency becomes very high, 7.2 GHz. No commercially available ten-bit ADC devices operate at such a high speed. In accordance with the present invention, digital polarimeter techniques becomes feasible with the input data sampled at a much lower frequency achievable with available ADC devices (e.g., as few as twenty samples per IF cycle with at least eight bits of amplitude quantization).

Figure 4:
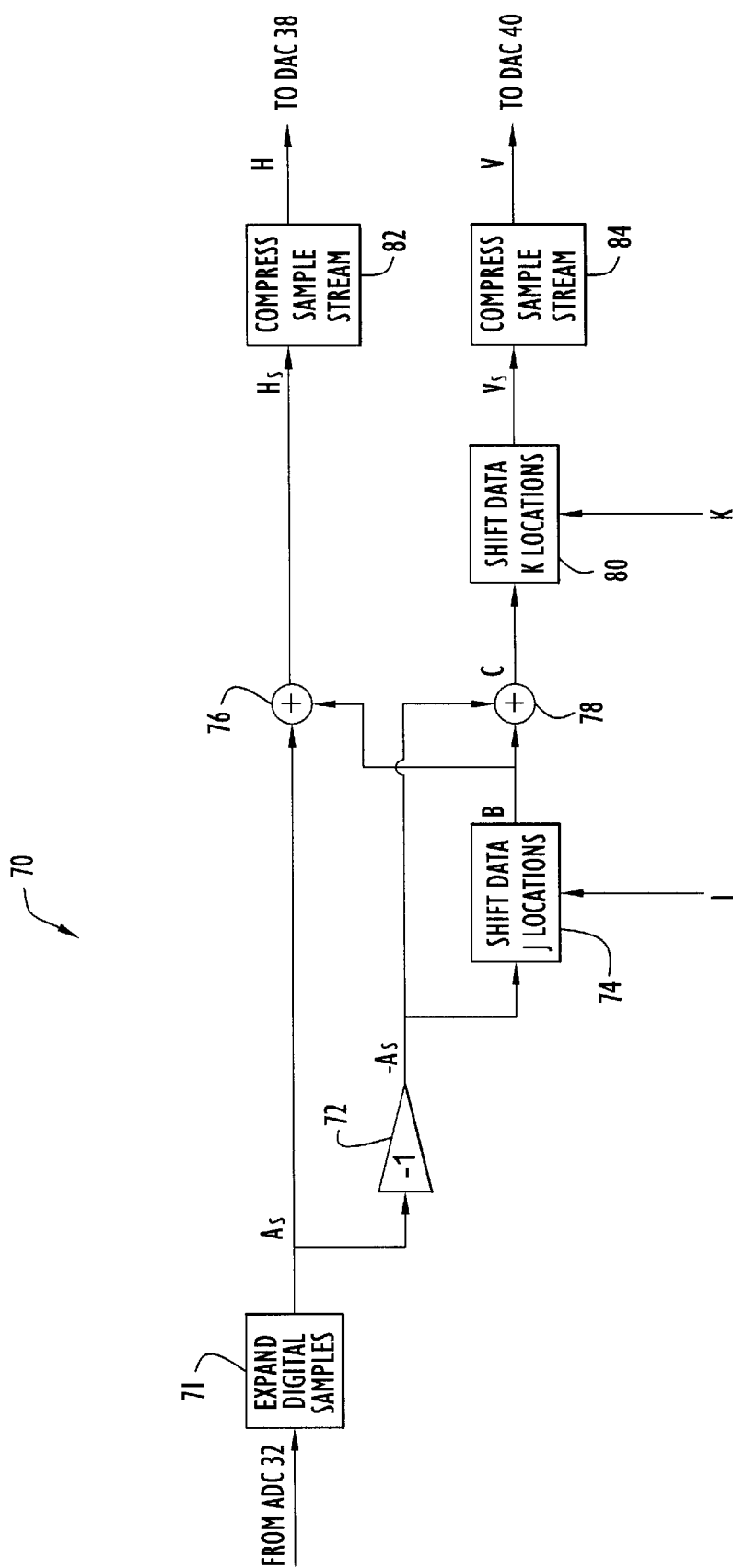
FIG. 4 is a block diagram illustrating the digital transmit polarimeter of the exemplary embodiment of the present invention.

Referring to FIGS. 3 and 4, prior to performing polarimetric operations on the digital signal samples generated by the ADC, the transmit polarimeter of the present invention first time stretches the digital signal data (step 92 in FIG. 3, block 71 in FIG. 4). In order to apply the polarization with a desired accuracy, each cycle of the IF signal must be sampled at appropriate time intervals. Again, to achieve a phase resolution of at least 0.5 degrees, assuming the IF frequency is 10 MHz, the required sampling rate must be 7.2 GHz. Sampling the IF signal at a much lower rate than 7.2 GHz, the present invention nevertheless achieves polarization accuracy comparable to that of conventional analog polarimeters.

Figure 5:
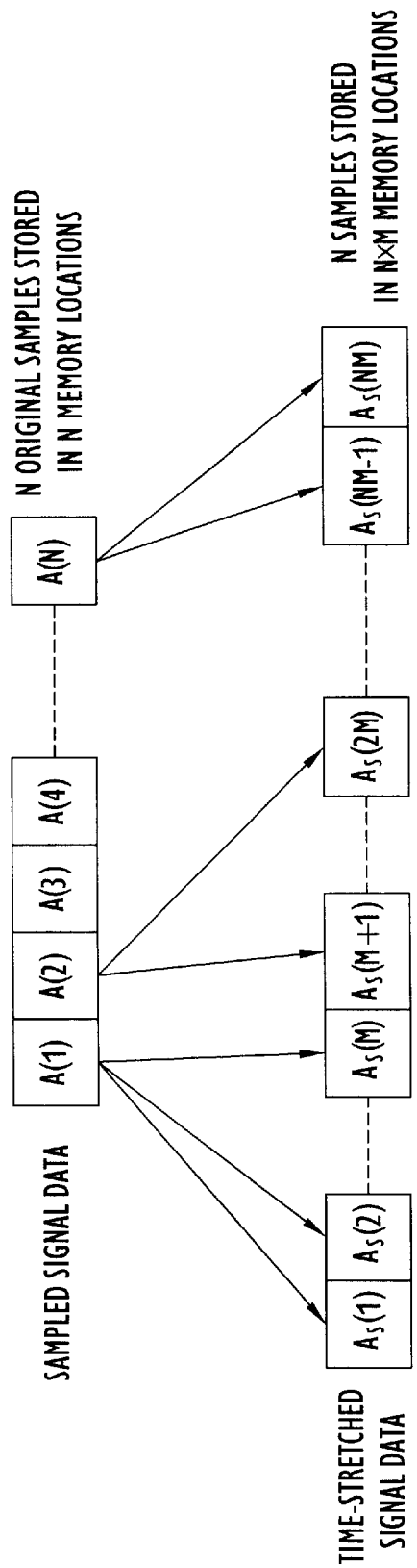
FIG. 5 is a diagram showing time stretching of sampled signal data in accordance with the present invention.

More particularly, in accordance with the present invention, the IF input signal is sampled at a rate as low as approximately twenty times per cycle. Assuming an IF of 10 MHz, the sampling rate is 200 MHz. At the rate of twenty samples per cycle, each sample represents the signal at eighteen-degree intervals. In processor 36, the signal time parameter is then essentially "stretched" to yield signal data with an equivalent 0.5 degree phase resolution. Referring to FIG. 5, the sampled signal A is shown as a sequence of N original samples A(1), A(2), A(3), . . . , A(N). For purposes of illustration, data spanning only one cycle of signal samples is shown in FIG. 5. The signal stretching is accomplished by storing each of the N samples of the signal A in M adjacent memory locations, increasing the total number of signal A samples to M×N, where N is the number of the real, original samples per IF cycle (in this example, N=20). Sample A(1) is stored in the first M memory locations, sample A(2) is stored in the next M memory locations, and each subsequent sample is stored in M consecutive memory locations, forming an M×N sequence in memory locations.

The value of M is derived from the required number of samples per cycle divided by the actual number of samples per cycle. In the foregoing example, the number of actual samples per cycle is 20, and the number of required samples is 720; thus, M=720/20 =36. In essence, the time span of a single signal cycle (0.1 $\mu$sec) is stretched to 3.6 $\mu$sec (36×0.1 $\mu$sec). Sampling the stretched version of the signal at 200 MHz, yields seven hundred and twenty (720) 0.5 degree samples. The data expansion for M=36 results in twenty signal A samples being redistributed to N×M=720 memory locations. The individual locations contribute to the computed signal data equivalent of a 0.5 degree phase resolution. Because each sample is stored in M memory locations, each incremental phase shift from one memory location to the next corresponds to one $M^{th}$ (1/M) of the actual sampling interval. The stretching process effectively increases the digital sampling frequency and provides the number of samples per cycle and, hence, phase resolution required to accurately apply high resolution polarization characteristics to the transmit signal.

Once the time-expanded samples of input signal A are stored in the M×N memory locations, processor 36 begins performing polarimetric operations on the time stretched signal samples. As best seen by comparing FIG. 4 with FIG. 1, the digital polarimeter essentially carries out the digital equivalent of the operations performed by the analog polarimeter. In the analog polarimeter, hybrid devices and phase shifters operate on an input RF signal to generate horizontal (H) and vertical (V) components of the transmit signal in accordance with equations (1) and (2). Correspondingly, the digital polarimeter of the present invention operates on the time-stretched digital IF signal samples to generate time-stretched horizontal ($H_S$) and vertical ($V_S$) signal components in accordance with the following expressions:

$$H_S(i)=A_S(i)-A_S(i+j) \quad (3)$$

$$V_S(i)=-A_S(i+k)-A_S(i+j+k) \quad (4)$$

where $A_S(i)$ is the $i^{th}$ sample in the time-stretched sequence of stored signal A samples, $A_S(i+k)$ is the $i+k^{th}$ $A_S$ sample, etc., and k and j represent an integer number of one-sample time shifts from time reference i (in this example, k and j can be varied from 0 to 719). Equations (3) and (4) define the architecture and the steps required to conduct computation of the digital samples of the horizontal and vertical components of the transmit signal within processor 36.

Referring again to FIGS. 3 and 4, the sign of each sample of the digital data string of time-stretched input signal $A_S$ is inverted in step 94 to produce an inverted data string representing time-stretched signal $-A_S$, which data string is stored in memory 34. Generation of the inverted signal $A_S$ is shown diagrammatically in FIG. 4 via sign inverter 72, which receives samples of time-stretched signal As and generates samples of signal $-A_S$. In a manner analogous to analog phase shifter 12 (FIG. 1) which applies a phase shift γ to the inverter input analog RF signal, in step 96, processor 36 implements the digital equivalent of phase shift on the samples of signal $-A_S$ by shifting the data by j discrete memory locations to produce an output signal B, where $B(i)=-A_S(i+j)$. In digital transmit polarimeter 70 representation shown in FIG. 4, this operation is performed by a data shifter 74, which functions as a shift register type network that delays all signal data elements by j positions. Again, in practice, this operation can be performed by hardware, software or a combination of hardware and software.

In step 98, the time-stretched horizontal component $H_S$ of the transmit signal is generated by combining (summing) samples of the time-stretched signal $A_S$ with corresponding samples of signal B(i) (adder 76 in FIG. 4), such that $H_S(i)=A_S(i)+B(i)=A_S(i)-A_S(i+j)$, as given by equation (3). To acquire the time-stretched vertical component $V_S$ of the transmit signal, samples of the inverted signal $-A_S$ are combined with corresponding samples of signal B (step 100, adder 78) to produce a signal C, where $C(i)=-A_S(i)+B(i)$. As depicted by data shifter 80 in FIG. 4 (step 102 in FIG. 3), the samples of signal C are then shifted by k discrete memory locations to effectively apply a phase shift φ, thereby yielding samples of the vertical component $V_S$, where $V_S=C(i+k)=-A_S(i+k)+B(i+k)=-A_S(i+k)-A_S(i+j+k)$, as given by equation (4).

The number of memory location shifts j and k correspond to the phase shifts γ and φ respectively required to apply the desired polarization to the transmit signal. Where the transmitter is generating a signal in response to an intercepted signal processed by a receive polarimeter (i.e., closed loop operation), the phase information for data shifts j and k is supplied by the receive polarimeter. If the receive polarimeter is a digital polarimeter employing the same scale of time stretching, such as that disclosed in the aforementioned U.S. patent application Ser. No. 09/09/711,168, filed Nov. 13, 2000, the values of j and k are determined by the receive polarimeter and can be directly applied by the transmit polarimeter to the time-stretched digital signal samples.

If the polarization phase information is supplied to the transmit polarimeter in the form of phase values γ and φ, the appropriate corresponding values of j and k can readily be computed from a direct linear translation based upon the number of digital samples/cycles used to represent one cycle of the analog signal and the degree of accuracy of the phase shift values provided by γ and φ. By knowing the number of degrees of the IF signal that corresponds to one time shift (in the foregoing example, 0.5 IF degrees), the phase values γ and φ can be directly converted to count values j and k that respectively represent these phase values to the nearest 0.5 degrees. Importantly, these phase shifts can be applied very accurately to the time stretched signal, since each incremental value of j or k increments the corresponding phase shift by only 0.5 degree; thus, phase values γ and φ can very precisely be represented by memory location count values j and k. In contrast, these phase shifts could be applied only very coarsely to the original un-stretched digital data sample (i.e., to the nearest 18 degrees), thereby failing to achieve the required polarization angular accuracy.

The transmit polarimeter of the present invention can also be configured to operate in an open-loop manner, wherein the polarimeter phase information is not received directly from a receive polarimeter processing an intercepted signal. In this open-loop case, the polarization phase information supplied to the transmit polarimeter can be generated in advance in accordance with a particular predetermined signaling scheme or can be derived from or related to certain operating conditions or information relating to a particular target or emitter. Such phase information can be locally generated or generated remotely and transmitted to the platform or ECM system containing the transmit polarimeter. As with the closed-loop case, if the polarization information is supplied in the form of phase values, these phase values can be translated into corresponding memory location count values for j and k for use in the digital transmit polarimeter. If the polarization information is received as memory location count values, no translation is necessary (assuming the polarization information accounts for the time-stretching scale used).

The time scale of the time-stretched horizontal $H_S$ and vertical $V_S$ digital data sets is M times greater than the real time base. To return the data sets to the real time base, in steps 104 and 106, the time-stretched horizontal and vertical component data sets are respectively time compressed (FIG. 4, 82 and 84). Time compression is accomplished by sampling the time-stretched component data samples at the original sampling frequency used by the digital-to-analog converter to sample the input IF signal (in this example, twenty samples per IF cycle), thereby returning the digital signal components to the original time scale. More specifically, as shown in FIGS. 6A and 6B, every $M^{th}$ sample (where M is the stretching factor) of the time-stretched $H_S$ and $V_S$ signal component data sets is selected and stored as a sample of the time-compressed signal components H and V, respectively, such that each time-stretched component represented by N×M samples is compressed to a real time component represented by N samples per cycle (where N is the number of ADC samples per IF cycle). In the foregoing example, the input IF analog signal having a frequency of 10 MHz is sampled at 200 MHz or twenty times per cycle (every 18 degrees). To obtain the required angular accuracy of 0.5 degrees, the sampled signals are time stretched by a factor of thirty-six, resulting in 720 samples per cycle. To compress the time-stretched signals back to real time, the 720 samples per cycle are reduced to 20 samples per cycle by selecting every thirty-sixth sample of the time-stretched signal for inclusion in the time-compressed signal.

Once the horizontal and vertical component digital signals are compressed back to the original, real-time time scale, the signals are converted to analog IF signals by digital-to-analog converters, and then up-converted to the original RF frequency by mixing the IF component signals with the LO signal in an up-frequency converter, yielding RF horizontal and vertical signal components for power amplification and transmission via a dual polarized transmit/receive antenna. As used herein and in the claims, the term "digital-to-analog converter device" refers to any device capable of converting the digital horizontal and vertical signal components to analog signals. As shown in FIG. 2, the digital-to-analog converter device includes two distinct DACs 38 and 40; however, the present invention is not limited to this particular configuration.

The ability to digitally perform the function of a polarimeter network in a transmit polarimeter is made feasible by the invented technique. The signal data processing architecture makes possible the digital generation of polarization agile signals with current technology ADC devices which are used in sampling the input signal. The process of stretching the input signal which has been sampled at a relatively low rate, delaying strings of data, performing summing operations, and finally compressing the generated data produces a polarization agile signal that produces a deep null when tested with a receiver polarimeter. The resulting null depth is comparable to that of a signal produced by an analog polarimeter network instrumented with phase shifters, and/or a hypothetical digital polarimeter that operates on its input signal sampled at the required high sampling rate. It has been numerically illustrated that the requirement of 7.2 GHz can be satisfied with a sampling rate equal to, or even lower than, 200 MHz. An even lower sampling rate can be used if an I and Q (quadrature) signal sampling technique is employed.

The validity of the present invention has been confirmed by simulation conducted with a computer model. A special purpose computer model was assembled using Matlab (Simulink) simulation program blocks. The model was prepared to simulate the signal processing functions described herein as well as a theoretical high speed digital polarimeter that operates on the input signal sampled at 7.2 GHz. In both polarimeter models, eight bit amplitude sampling was used. The quality of the polarization agile signal generated by the technique of the present invention was found to be comparable to that of the theoretical high-speed digital polarimeter (where the signal is sampled at the actual required 7.2 GHz rate) in terms of null depth performance. The results of the validation are presented as "snapshots" of the program output, including signal waveforms synthesized at the successive stages of the processing and the achievable null depth of the resultant polarization agile signal.

Referring now to FIG. 6, time waveforms generated at the stages leading to the resultant polarization agile signal are shown. While the horizontal direction of the graph in FIG. 6 depicts relative time, and the vertical direction represents relative amplitude, the positioning of the various waveforms within the graph is arbitrary, and the horizontal and vertical axis labeling does not reflect absolute time or amplitude. For example, the graph indicates that both waveforms 130 and 132 fluctuate in amplitude by two normalized "units"; however, the graph should not be interpreted to indicate that waveform 130 has a higher amplitude than waveform 132 due to a higher vertical position on the graph. Likewise, the graph of FIG. 6 does not attempt to depict a true time sequence of the waveforms but merely a relative time scale. For purposes of quantifying the model output, the polarization agile signal components, as normally measured by the receiver polarimeter, are taken as in-phase with 0.5 ratio of their amplitudes. Characteristics of the generated waveforms reflect the received signal parameter values (they are 180 degrees out of phase).

In particular, waveform 130 represents five cycles of the input signal sampled at 18 degree phase intervals (20 samples per cycle). One cycle of the time-stretched input signal 132, which has been time stretched by a factor of thirty-six, is also shown. The resulting synthesized signal components H and V are presented at 134 and 136, respectively, on the stretched-time base. These waveforms are with inverted amplitudes and are 180 degrees out of phase, as required by the input signal components. Waveforms 134 and 136 depict five cycles of the output signal components H and V, respectively, after compressing the stretched signals H and V by a factor of thirty-six, thereby restoring the signals to a real time basis (twenty samples per cycle).

Figure 7:
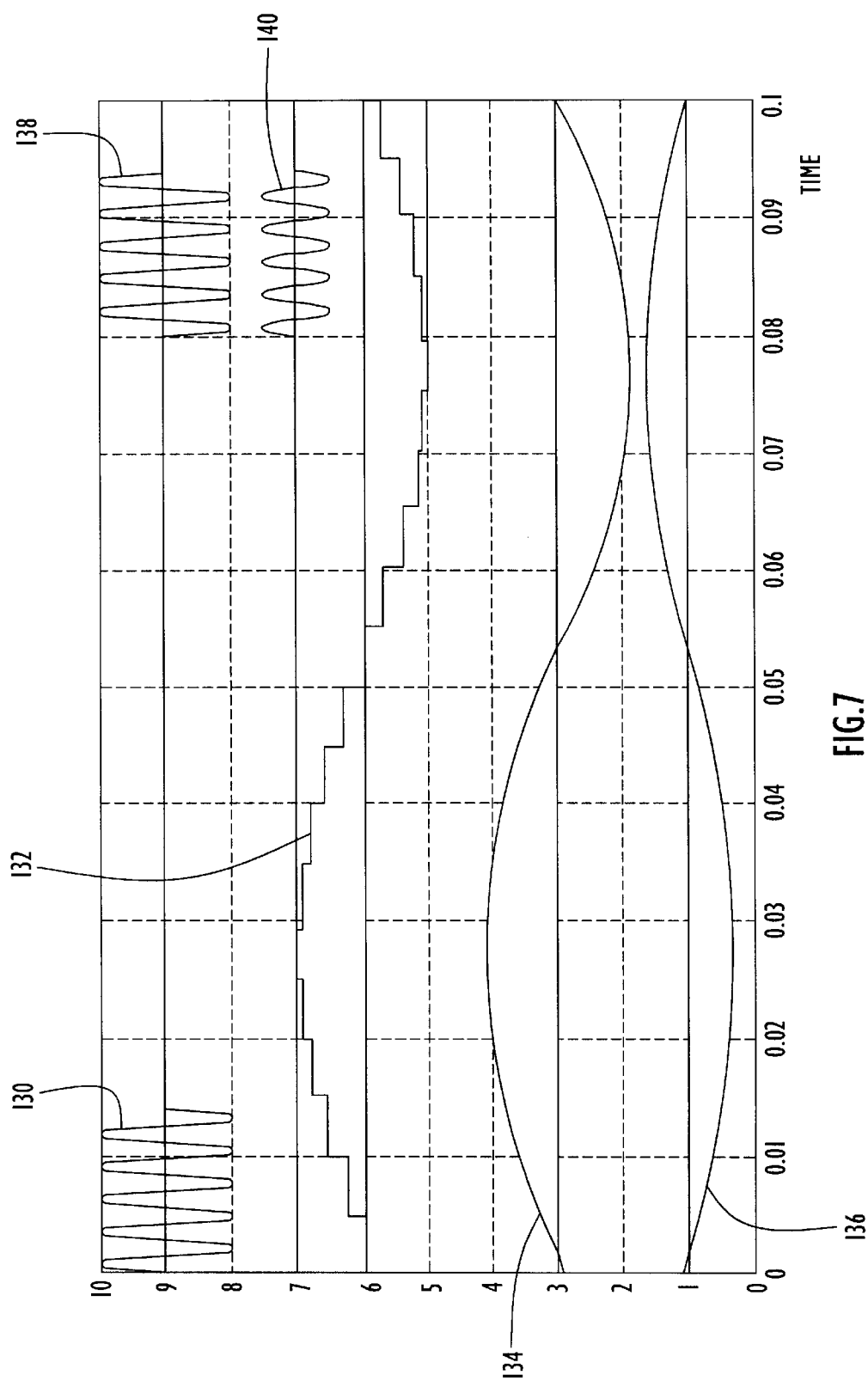
FIG. 7 is a graph of simulated waveforms generated at stages of the signal processing operations depicted in FIG. 3.
Figure 8:
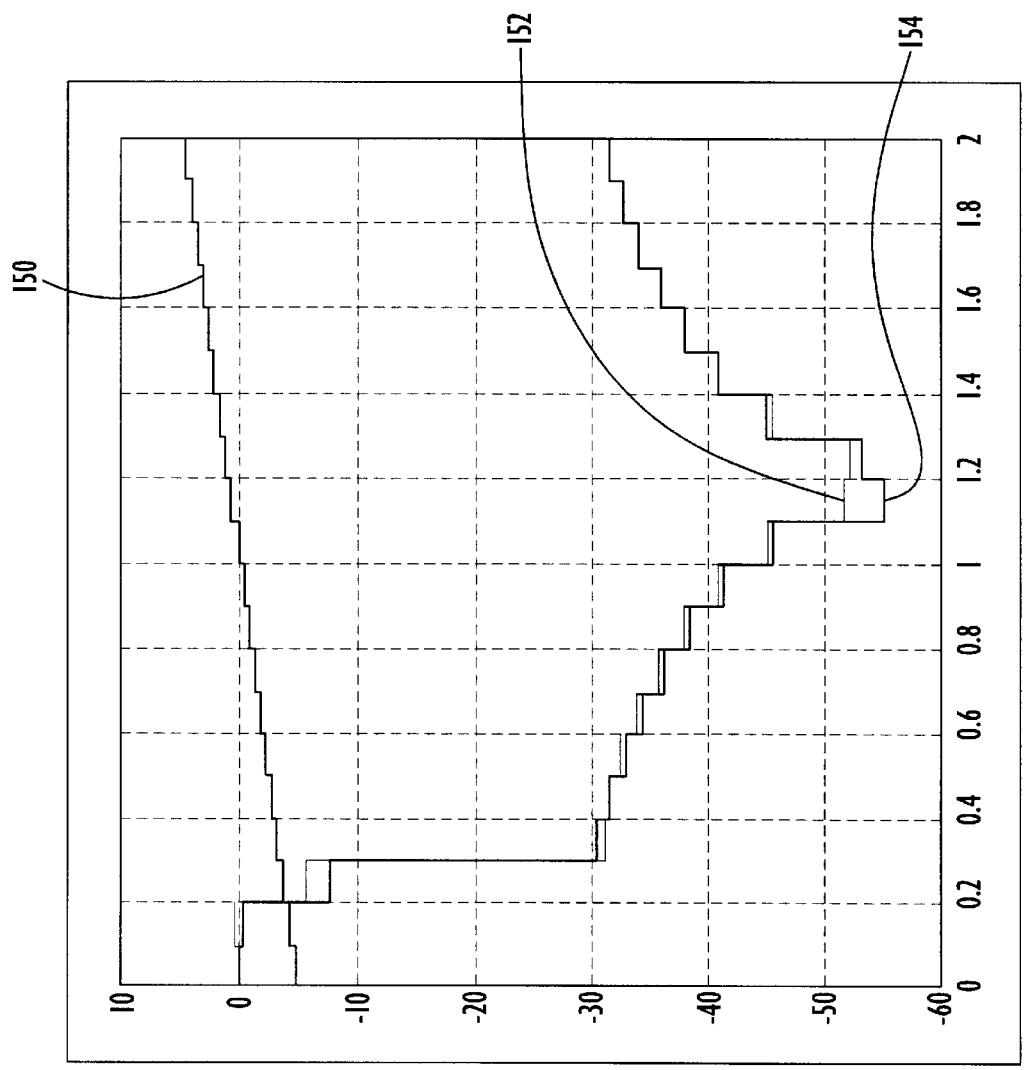
FIG. 8 is a graph of simulated waveforms demonstrating the sensitivity of the polarization agile signal generated by the digital transmit polarimeter to changes in input phase angle characteristics.

FIG. 7 presents simulated waveforms that demonstrate the sensitivity of the polarization agile signal generated by the invented system. Waveform 152 was generated by providing simulated polarized signal components H and V as inputs to a simulated receiver polarimeter connected in the reversed sense. To illustrate graphically changes in the null depth characteristics due to errors in phase, the value of the applied transmit signal polarization phase angle was varied over the range of −10 to +10, as represented by waveform 150. Each step is equivalent to 0.5 degrees (errors) in phase and shown as a staircase with a positive slope at the top of the graph (−5.0 to +5.0). The null depth is shown on a dB scale, calculated for each change in the input phase angle. The first two changes represent, what amounts to, a transient response. After settling, the null depth slowly increases, rapidly reaching the level of −52 dB, maximum depth, at the point where the deviation is zero, and then continues to decrease. For the purpose of comparison, waveform 154 shows the null depth for a theoretical polarization agile signal generated by a conventional digital technique where the input signal is sampled at the required 7.2 GHz rate. As can be seen from FIG. 7, null depth characteristics of the signal produced by the invented technique are comparable to that of a signal generated using the convention digital technique.

The above-described simulations and exemplary embodiment demonstrate how a digital transmit polarimeter can be used to generate polarization agile transmission signals that meet specific operational and/or tactical objectives. The application of polarization characteristics is accomplished entirely in the digital domain. The invented technique replaces more than just the analog polarimeter in a polarization agile transmission system. Using this technique, the need for considerable analog polarimeter network support components is eliminated. Thus, use of the digital transmit polarimeter of the present invention allows development of higher performance EW systems of smaller size, less weight, greater power efficiency and less cost than those that employ conventional high-power analog transmit polarimeters. The digital transmit polarimeter of the present invention also offers the potential of a more reliable system, with a greater mean time between failures. The digital transmit signal information can be processed and manipulated by digital processors in virtually any manner before being "reconstituted" in the form of a polarization agile transmission signal. Furthermore, digital input signal phase and amplitude information can be received from a remote receive polarimeter via virtually any digital transmission media. Together, these two capabilities provide great flexibility not only with respect to the characteristics of the signal to be transmitted, but also with respect to the location, and/or multiple locations, from which the signal will be transmitted.

With the digital polarimeter approach described herein, polarization agile H and V signal components can be generated based upon analog or digital transmit signals or signal characteristics from integrated, external or remote receivers or data stores. For example, the digital polarimeter can be integrated with, or locally coupled to, an analog and/or digital receiver polarimeter and/or receiver antennas and obtain transmit signal characteristics directly from those devices. Alternatively, the digital polarimeter can receive analog or digital signal characteristics from one or more remote receivers, polarimeters or ground stations via a data link. Information provided to the digital polarimeter can be base upon the monitoring of active signals or based upon previously stored analog or digital signal recordings and characteristics, allowing transmit signals and signal characteristics to be either partially or entirely data-driven.

The ability to use digital or analog input components coupled with the ability to digitally manipulate the signal data and component characteristics provides complete control over the final, transmitted signal to meet virtually any particular operational need. Signal amplitude, frequency, and polarization can each be independently replicated or synthesized. For example, a signal could be measured by a receiver and provided in either analog or digital form to the polarimeter via a direct tie-in. Polarization data applied to the same signal can be based upon input from a digital or analog polarimeter or synthesized. The applied polarization can be held constant or made agile (e.g., rotated continuously through all 360 degrees or varied) based upon a chosen algorithm or stored data set. Alternatively, polarization characteristics can be held constant while signal data and signal frequency are independently varied.

Use of signal characteristics determined by local and remote receivers is not limited to a single digital polarimeter system. The same measured signal or signal characteristics may be broadcast to multiple digital polarimeter systems, allowing the transmission of plural polarization agile signals based upon the information received/initiated by a relatively small number of receivers. Processing within each digital polarimeter system can proceed in a uniform manner or vary based upon additional information received or stored locally by the digital polarimeter system. For example, each digital polarimeter system can maintain translation tables to allow adjustments to the signals received or perform adjustments based upon other stored or locally measured data.

While the present invention has been described in the context of an EW system, the present invention is not limited to this particular application. In general, the digital transmit polarimetric system can be used in virtually any system that requires the accurate generation and transmission of a polarization agile signal. For example, the system of the present invention could be used in radar testing, or testing of virtually any electromagnetic transmission system under conditions where polarization or polarization agility is of interest. Consequently, the present invention is not limited to the particular configurations disclosed herein, and other signal combination schemes that employ the techniques of the present invention are considered to be within the scope of the invention. For example, the application of data shifts to time-stretched signal streams could be employed using relationships other than those set forth in equations (3) and (4).

Having described preferred embodiments of a new and improved digital polarization agile signal transmission system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for generating a polarization agile signal, comprising:
   (a) time stretching a digital input signal by representing each of a number of samples of the digital input signal as a plurality of time-stretched samples to produce a time-stretched signal;
   (b) generating digital time-stretched signal components of the polarization agile signal from the time-stretched signal and polarization data;
   (c) time compressing the digital time-stretched signal components to produce digital signal components of the polarization agile signal; and
   (d) generating the polarization agile signal from the digital signal components.

2. The method of claim 1, wherein an effective phase resolution of the time-stretched signal is greater than that of the digital input signal.

3. The method of claim 1, wherein (a) includes storing each of said number of samples in plural memory locations.

4. The method of claim 1, wherein the digital input signal comprises N samples per signal cycle, where N is a positive number, and wherein (a) includes storing each of the N samples in M memory locations, such that M×N samples are stored for each signal cycle, where M is a positive integer.

5. The method of claim 1, wherein the polarization data includes first and second polarization phase data and (b) includes:
   (b1) inverting samples of the time-stretched signal to produce an inverted signal;
   (b2) shifting samples of the inverted signal by a number of sample positions in accordance with the first polarization phase data to produce a shifted signal;
   (b3) adding the time-stretched-signal and the shifted signal to produce a first digital time-stretched signal component of the polarization agile signal;
   (b4) adding the inverted signal and the shifted signal to produce a sum signal; and
   (b5) shifting samples of the sum signal by a number of sample positions in accordance with the second polarization phase data to produce a second digital time-stretched signal component of the polarization agile signal.

6. The method of claim 5, wherein the first and second digital time-stretched signal components respectively correspond to the horizontal and vertical polarization components of the polarization agile signal.

7. The method of claim 1, wherein the polarization data comprises phase values representing polarization phase and amplitude information.

8. The method of claim 1, wherein the polarization data comprises integer values representing numbers of memory location shifts.

9. The method of claim 1, further comprising:
   (e) sampling an input analog signal to generate the digital input signal, wherein a phase resolution of the time-stretched sequence of digital samples is a function of a sampling rate of the digital input signal and a number of memory locations in which each of said number of samples is stored.

10. The method of claim 9, further comprising:
    (f) down converting an input radio frequency signal to produce the input analog signal at an intermediate frequency.

11. The method of claim 1, wherein (d) includes:
    (d1) converting the digital signal components to analog intermediate frequency signal components; and
    (d2) up-converting the analog intermediate frequency signal components to radio frequency signal components.

12. An apparatus for generating a polarization agile signal, comprising:
    an analog-to-digital converter configured to digitally sample an input signal to produce a digital input signal;
    a processor configured to generate a time-stretched signal by representing each of a number of samples of the digital input signal as a plurality of time-stretched samples, said processor generating digital time-stretched signal components of the polarization agile signal from the time-stretched signal and polarization data, and time compressing the digital time-stretched signal components to produce digital signal components of the polarization agile signal; and a digital-to-analog converter device configured to receive the digital signal components and generate corresponding analog signal components of the polarization agile signal.

13. The apparatus of claim 12, further comprising a memory device coupled to said processor and configured to store samples of the digital input signal and the time-stretched signal.

14. The apparatus of claim 13, wherein:
said analog-to-digital converter samples the input signal at a sampling rate of N samples per signal cycle, where N is a positive number; and
said memory device stores each of the N samples in M memory locations, such that M×N samples are stored for each signal cycle, where M is a positive integer.

15. The apparatus of claim 14, wherein a phase resolution of the time-stretched signal is a function of the sampling rate and the number of memory locations M in which each of said number of samples is stored.

16. The apparatus of claim 12, wherein an effective phase resolution of the time-stretched signal is greater than that of the digital input signal.

17. The apparatus of claim 12, wherein the polarization data includes first and second polarization phase data and said processor includes:
a signal inverter configured to inverter values of samples of the time-stretched signal to produce an inverted signal;
a first data shifter configured to shift samples of the inverted signal by a number of sample positions in accordance with the first polarization phase data to produce a shifted signal;
a first adder configured to add the time-stretched signal and the shifted signal to produce a first digital time-stretched signal component of the polarization agile signal;
a second adder configured to add the inverted signal and the shifted signal to produce a sum signal; and a
second data shifter configured to shift samples of the sum signal by a number of sample positions in accordance with the second polarization phase data to produce a second digital time-stretched signal component of the polarization agile signal.

18. The apparatus of claim 17, wherein the first and second digital time-stretched signal components respectively correspond to the horizontal and vertical polarization components of the polarization agile signal.

19. The apparatus of claim 12, wherein the polarization data comprises phase values representing polarization phase and amplitude information.

20. The apparatus of claim 12, wherein the polarization data comprises integer values representing numbers of memory location shifts.

21. The apparatus of claim 12, wherein said digital-to-analog converter device comprises plural digital-to-analog converters.

22. The apparatus of claim 12, further comprising:
a down converter configured to convert an input radio frequency signal to an intermediate frequency to produce the input signal.

23. The apparatus of claim 12, further comprising:
an up converter configured to convert the analog signal components of the polarization agile signal from an intermediate frequency to a transmission frequency.

24. The apparatus of claim 23, further comprising a dual-polarization antenna configured to receive the analog signal components and transmit the polarization agile signal at the radio frequency.

25. An apparatus for generating a polarization agile signal, comprising:
means for time stretching a digital input signal by representing each of a number of samples of the digital input signal as a plurality of time-stretched samples;
means for generating digital time-stretched signal components of the polarization agile signal from the time-stretched signal and polarization data;
means for time compressing the digital time-stretched signal components to produce digital signal components of the polarization agile signal; and
means for producing the polarization agile signal from the digital signal components.

26. The apparatus of claim 25, wherein an effective phase resolution of the time-stretched signal is greater than that of the digital input signal.

27. The apparatus of claim 25, wherein said means for time stretching includes means for storing each of said number of samples in plural memory locations.

28. The apparatus of claim 25, wherein the digital input signal comprises N samples per signal cycle, where N is a positive number, and wherein means for time stretching includes means for storing each of the N samples in M memory locations, such that M×N samples are stored for each signal cycle, where M is a positive integer.

29. The apparatus of claim 25, wherein the polarization data includes first and second polarization phase data and said means for generating includes:
means for inverting samples of the time-stretched signal to produce an inverted signal;
means for shifting samples of the inverted signal by a number of sample positions in accordance with the first polarization phase data to produce a shifted signal;
means for adding the time-stretched signal and the shifted signal to produce a first digital time-stretched signal component of the polarization agile signal;
means for adding the inverted signal and the shifted signal to produce a sum signal; and
means for shifting samples of the sum signal by a number of sample positions in accordance with the second polarization phase data to produce a second digital time-stretched signal component of the polarization agile signal.

30. The apparatus of claim 29, wherein the first and second digital time-stretched signal components respectively correspond to the horizontal and vertical polarization components of the polarization agile signal.

31. The apparatus of claim 25, wherein the polarization data comprises phase values representing polarization phase and amplitude information.

32. The apparatus of claim 25, wherein the polarization data comprises integer values representing numbers of memory location shifts.

33. The apparatus of claim 25, further comprising:
means for sampling an input analog signal to generate the digital input signal, wherein a phase resolution of the time-stretched sequence of digital samples is a function of a sampling rate of the digital input signal and a number of memory locations in which each of said number of samples is stored.

34. The apparatus of claim 33, further comprising:
means for down converting an input radio frequency signal to an intermediate frequency to produce the input analog signal.

35. The apparatus of claim 25, wherein said means for producing includes:
 means for converting the digital signal components to analog intermediate frequency signal components; and
 means for up-converting the analog intermediate: frequency signal components to radio frequency signal components.

36. A digital polarimetric system for generating a polarization agile signal, comprising:
 an analog-to-digital converter configured to digitally sample an input signal;
 a memory device configured to receive digital samples from said analog-to-digital converter and store each of the digital samples in a plurality of memory locations to form a time-stretched sequence of digital samples;
 a digital signal processor configured to generate digital time-stretched signal components of the polarization agile signal from the time-stretched sequence of digital samples and polarization data, and time compress the digital time-stretched signal components to produce digital signal components of the polarization agile signal;
 a digital-to-analog converter device configured to receive the digital signal components and generate corresponding analog signal components of the polarization agile signal;
 a frequency converter configured to convert a frequency of the analog signal components to a transmission frequency; and
 a dual-polarization antenna configured to receive the analog signal components and transmit the polarization agile signal.

37. The system of claim 36, wherein a phase resolution of the time-stretched signal is a function of a sampling rate of said analog-to-digital converter and a number of memory locations in which each of the digital samples is stored in said memory device.

38. A digital transmit polarimeter, comprising:
 a signal time-stretching processor configured to produce a time-stretched signal by representing each of a number of samples of a digital input signal as a plurality of time-stretched samples;
 a data inverter configured to invert-samples of the time-stretched signal to produce an inverted signal;
 a first data shifter receiving first polarization data and delaying samples of the inverted signal by a number of sample, positions in accordance with first polarization data to produce a shifted signal;
 a first signal combiner configured to add the time-stretched signal and the shifted signal to produce a first digital time-stretched signal component of the polarization agile signal;
 a second signal combiner configured to add the inverted signal and the shifted signal to produce a sum signal;
 a second data shifter receiving second polarization data and delaying samples of the sum signal by a number of sample positions in accordance with second polarization data to produce a second digital time-stretched signal component of the polarization agile signal; and
 first and second signal time-compressing processors configured to respectively compress the first and second digital time-stretched signal components to produce first and second digital signal components of the polarization agile signal.

39. The polarimeter of claim 38, wherein an effective phase resolution of the time-stretched signal is greater than that of the digital input signal.

* * * * *